(12) United States Patent
Han

(10) Patent No.: US 8,333,837 B2
(45) Date of Patent: Dec. 18, 2012

(54) JUTE FIBER-REINFORCED COMPOSITION FOR CONCRETE REPAIR

(75) Inventor: Kyu-Tech Han, Seoul (KR)

(73) Assignee: Samju SMC Co., Ltd., Seoul (KR)

( * ) Notice: Subject to any disclaimer, the term of this patent is extended or adjusted under 35 U.S.C. 154(b) by 0 days.

(21) Appl. No.: 13/386,405

(22) PCT Filed: Jun. 23, 2010

(86) PCT No.: PCT/KR2010/004089
§ 371 (c)(1),
(2), (4) Date: Jan. 20, 2012

(87) PCT Pub. No.: WO2011/010805
PCT Pub. Date: Jan. 27, 2011

(65) Prior Publication Data
US 2012/0111235 A1     May 10, 2012

(30) Foreign Application Priority Data

Jul. 23, 2009  (KR) ........................ 10-2009-0067167

(51) Int. Cl.
*C04B 24/10* (2006.01)
*C04B 24/04* (2006.01)
*C04B 14/06* (2006.01)
*C04B 16/02* (2006.01)
*C04B 24/40* (2006.01)
*C04B 28/04* (2006.01)

(52) U.S. Cl. ......... 106/731; 106/695; 106/708; 106/805

(58) Field of Classification Search ................. 106/731, 106/805, 695, 708
See application file for complete search history.

(56) References Cited

U.S. PATENT DOCUMENTS 5,643,359 A * 7/1997 Soroushian et al. .......... 106/805
5,883,025 A * 3/1999 Karstens et al. .............. 442/344

FOREIGN PATENT DOCUMENTS

FR          2932511 A1 * 12/2009
KR     10-0676311 B1      1/2007
KR     10-2009-0052461 A  5/2009

* cited by examiner

*Primary Examiner* — Anthony J Green
(74) *Attorney, Agent, or Firm* — Edwards Wildman Palmer LLP

(57) ABSTRACT

Disclosed is a concrete repair composition including an aggregate, a binder, and a fiber reinforcement, wherein the fiber reinforcement includes jute fiber having an average thickness of 65 to 75 μm and an average length of 3 to 6 mm. The jute fiber used for reinforcement has excellent dispersion and bonding when mixing. Also, the jute fiber has high moisture holding capacity, and thus the concrete repair composition can retain water therein during curing, thereby preventing a false-set problem caused by rapid hardening of cement.

2 Claims, No Drawings

JUTE FIBER-REINFORCED COMPOSITION FOR CONCRETE REPAIR

CROSS-REFERENCES TO RELATED APPLICATIONS

This application is a U.S. national phase application, pursuant to 35 U.S.C. §371, of PCT/KR2010/004089, filed Jun. 23, 2010, designating the United States, which claims priority to Korean Application No. 10-2009-0067167, filed Jul. 23, 2009. The entire contents of the aforementioned patent applications are incorporated herein by this reference.

BACKGROUND

1. Technical Field

The present invention relates to a concrete repair composition including an aggregate, a binder, and a fiber reinforcement.

2. Description of the Related Art

Concrete structures are structures predominantly made of cement, which is a hydraulic material that hydrates with water to generate a stable material. This hydration reaction produces an amount of calcium hydroxide equivalent to about one third of an amount of cement. Calcium hydroxide is a strong alkali having a pH of about 12 to 13, and forms a passive film on a rebar embedded in the concrete structures to prevent rebar corrosion, thereby maintaining the strength of the concrete structures.

However, the nature of concrete structures causes hairline cracks to form during initial curing. When water permeates into the cracks, the cracks in the concrete structures may grow by the repetition of freezing and melting of water depending on changes in temperature, which may remarkably reduce the durability of the concrete structures.

Particularly, when airborne salinity or an acidic substance such as carbon dioxide increasing in its level due to air pollution permeates into the concrete structures, the concrete structures may suffer from chloride-induced corrosion and carbonation. The corrosion may be accelerated by the rebar embedded in the concrete structures to maintain the strength of the concrete structures. In other words, when an acidic substance reacts with hydrate in concrete, in particular calcium hydroxide, the pH value of the concrete structures reduces below 10, accompanied by the breakdown of the passive film on the rebar, which causes the concrete structures to deteriorate by the likes of the rebar corrosion. By the rebar corrosion, the volume increases, which then applies tension to the surface of the concrete structures. Hence, the cracks on the surface of the concrete structures may grow to reduce the strength of the concrete structures.

As described above, concrete deterioration may progress under physical and chemical environment. Accordingly, extensive repair is needed.

To repair concrete, a variety of repair compositions have been used. Among them, there is cement mortar including an aggregate such as silica sand, a binder such as cement, and a fiber reinforcement such as glass fiber or carbon fiber. However, cement mortar has disadvantages of cracking during initial curing or delamination caused by poor bonding at the interface.

One of the most common defects that occur when repairing concrete is a defect generated at the interface between new concrete and deteriorated old concrete while curing since old dry concrete absorbs the moisture of fresh concrete after pouring, plastering, and spray coating. This causes a false-set problem, that is, rapid hardening of cement whereby cement just exists in the form of loose powder, failing to serve as a binder. As a result, a reduction in the interfacial bond between new concrete and old concrete leads to reduced bond strength, construction defects such as delamination, and the like.

To solve the foregoing problems, attempts have been continuously made to develop a concrete repair composition with good performance such as strength, alkali resistance, carbonization resistance, or water repellency.

SUMMARY OF THE INVENTION

Technical Problem

The present invention is designed to solve the above problems, and therefore it is an object of the present invention to provide a fiber-reinforced composition for concrete repair to prevent false set caused by rapid hardening of cement.

Also, it is an object of the present invention to provide a concrete repair composition with improved performance such as strength, alkali resistance, carbonization resistance, or water repellency.

Technical Solution

To achieve the objects of the present invention, a concrete repair composition may include an aggregate, a binder, and a fiber reinforcement, wherein the fiber reinforcement may include jute fiber having an average thickness of 65 to 75 μm and an average length of 3 to 6 mm.

According to the present invention, the concrete repair composition may include:

(a) 30 to 40 parts by weight of Ordinary Portland Cement Type 1;
(b) 2 to 6 parts by weight of Calcium Aluminate Cement;
(c) 2 to 5 parts by weight of Alumina Cement;
(d) 2 to 5 parts by weight of calcium sulfonate;
(e) 5 to 10 parts by weight of silica sand having an average particle size of 0.1 to 0.2 mm;
(f) 25 to 35 parts by weight of silica sand having an average particle size of 0.3 to 0.6 mm;
(g) 16 to 20 parts by weight of silica sand having an average particle size of 0.7 to 1.2 mm;
(h) 5 to 10 parts by weight of pozzolan powder;
(i) 0.4 to 0.8 pats by weight of alkylalkoxysilane; and
(j) 0.1 to 0.3 parts by weight of jute fiber having an average thickness of 65 to 75 μm and an average length of 3 to 6 mm.

Preferably, the concrete repair composition may further include (k) 0.1 to 0.5 parts by weight of tartaric acid, and (l) 0.3 to 0.6 parts by weight of lithium carbonate.

Advantageous Effects

According to an aspect of the present invention, the fiber-reinforced composition for concrete repair uses jute fiber for reinforcement, which has excellent dispersion and bonding when mixing. Also, the jute fiber has high moisture holding capacity, and thus the composition can retain water therein during curing, thereby preventing a false-set problem caused by rapid hardening of cement.

According to another aspect of the present invention, the fiber-reinforced composition for concrete repair has improved performance such as strength, alkali resistance, carbonization resistance, or water repellency, and thus is very useful in repairing deteriorated concrete.

DETAILED DESCRIPTION OF EMBODIMENTS

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A concrete repair composition of the present invention may include an aggregate, a binder, and a fiber reinforcement, and the fiber reinforcement may include jute fiber having an average thickness of 65 to 75 μm and an average length of 3 to 6 mm.

Jute fiber is obtained from perennials of Family Tiliaceae, Subclass Columniferae, Class Dicotyledoneae. Jute fiber is a hydrophilic natural cellulose fiber, and has excellent dispersion when mixing, thereby avoiding fiber agglomeration caused by the separation of materials when repairing concrete. Also, jute fiber has larger surface roughness and consequently better reinforcing performance than hydrophobic man-made fiber conventionally used in the art. The man-made fiber as a conventional reinforcement has smooth surface and consequently low binding performance, resulting in fiber pull-out from the matrix of the concrete repair composition. As a result, the bond strength at the interface between fresh concrete and old concrete reduces. It is obvious that a man-made fiber may be used together with jute fiber to improve the binding performance and the reinforcing performance such as strength.

Jute fiber has high moisture holding capacity to prevent defect generation at the interface between fresh concrete and old concrete during curing that commonly occurs when repairing concrete. As described above, when a hydrophilic man-made fiber is used for reinforcement as conventionally used, old dry concrete absorbs the moisture of fresh concrete. This causes a false-set problem, that is, rapid hardening of cement whereby cement just exists in the form of loose powder, failing to serve as a binder. As a result, a reduction in the interfacial bond between new concrete and old concrete leads to reduced bond strength, construction defects such as delamination, and the like. According to the present invention, jute fiber absorbs a large amount of water during mixing and then provides the water to the concrete to keep it moist during curing, thereby imparting good curing characteristics.

In the present invention, jute fiber used for reinforcement has an average thickness of 65 to 75 μm and an average length of 3 to 6 mm. The test results confirm that these ranges lead to excellent dispersion and workability.

Besides jute fiber, the concrete repair composition of the present invention includes, as a base component, an aggregate such as silica sand and a binder such as cement, and after mixing with water, may be used in repairing concrete in accordance with conventional methods.

To improve the performance of concrete such as strength, alkali resistance, carbonization resistance, or water repellency, the concrete repair composition including jute fiber may preferably include the following components:

(a) 30 to 40 parts by weight of Ordinary Portland Cement Type 1;
(b) 2 to 6 parts by weight of Calcium Aluminate Cement;
(c) 2 to 5 parts by weight of Alumina Cement;
(d) 2 to 5 parts by weight of calcium sulfonate;
(e) 5 to 10 parts by weight of silica sand having an average particle size of 0.1 to 0.2 mm;
(f) 25 to 35 parts by weight of silica sand having an average particle size of 0.3 to 0.6 mm;
(g) 16 to 20 parts by weight of silica sand having an average particle size of 0.7 to 1.2 mm;
(h) 5 to 10 parts by weight of pozzolan powder;
(i) 0.4 to 0.8 pats by weight of alkylalkoxysilane; and
(j) 0.1 to 0.3 parts by weight of jute fiber having an average thickness of 65 to 75 μm and an average length of 3 to 6 mm.

Hereinafter, the components will be described in more detail.

Binder

The concrete repair composition of the present invention uses, as a binder, a composite mineral binder system including (a) 30 to 40 parts by weight of Ordinary Portland Cement Type 1, (b) 2 to 6 parts by weight of Calcium Aluminate Cement, (c) 2 to 5 parts by weight of Alumina Cement, and (d) 2 to 5 parts by weight of calcium sulfonate. Within the above predetermined content ranges, these components exhibit excellent characteristics as a binder in terms of setting time, strength, minimized changes in material properties such as shrinkage and expansion, and the like.

Aggregate

The concrete repair composition of the present invention includes, as an aggregate, (e) 5 to 10 parts by weight of silica sand having an average particle size of 0.1 to 0.2 mm, (f) 25 to 35 parts by weight of silica sand having an average particle size of 0.3 to 0.6 mm, and (g) 16 to 20 parts by weight of silica sand having an average particle size of 0.7 to 1.2 mm.

It is found that this mixture of silica sands having different particle sizes contributes to porosity adjustment and stable aggregate structure after construction.

Functional Material

The concrete repair composition of the present invention includes (h) 5 to 10 parts by weight of pozzolan powder, (i) 0.4 to 0.8 pats by weight of alkylalkoxysilane, and (j) 0.1 to 0.3 parts by weight of jute fiber having an average thickness of 65 to 75 μm and an average length of 3 to 6 mm as a functional material to provide a specific function.

Within the above content range, pozzolan powder encourages the formation of ettringite by the process of hydration following hardening during curing, to improve the initial strength and long-term strength of concrete.

Alkylalkoxysilane is a compound having a hydrocarbon group such as a methyl group or a phenol group. The hydrolytic alkoxy group is hydrolyzed by water or moisture in the concrete repair composition to produce silanol that is coupled to the surface of the inorganic components to form oxane bonds, so that pores or capillaries present at the concrete surface are silanized to prevent the permeation of water and air.

Jute fiber is described above, and thus its detailed description is omitted.

Preferably, the concrete repair composition of the present invention may further include (k) 0.1 to 0.5 parts by weight of tartaric acid and (l) 0.3 to 0.6 parts by weight of lithium carbonate.

Within the above content range, tartaric acid properly retards the initial setting time when Alumina Cement or Ordinary Portland Cement Type 1 is hardened by the process of hydration, thereby improving workability. Also, the addition of lithium carbonate within the above content range accelerates the setting of the concrete repair composition of the present invention treated on the surface of concrete to assist the formation of a robust coating.

In addition to the foregoing components (a) to (l), the concrete repair composition of the present invention may further include resins, a melment-based superplasticizer, a thickening stabilizer, and the like, that are used in a cement-based composition for concrete repair.

Hereinafter, various preferred examples of the present invention will be described in detail for better understanding.

However, the examples of the present invention may be modified in various ways, and they should not be interpreted as limiting the scope of the invention. The examples of the present invention are provided so that persons having ordinary skill in the art can better understand the invention.

EXAMPLE

The concrete repair composition of the present invention was prepared by mixing 35 parts by weight of Ordinary Portland Cement Type 1, 2 parts by weight of Calcium Aluminate Cement, 2 parts by weight of Alumina Cement, 3 parts by weight of calcium sulfonate, 8 parts by weight of silica sand (average particle size 0.1 mm), 30.2 parts by weight of silica sand (average particle size 0.4 mm), 18 parts by weight of silica sand (average particle size 1.0 mm), 7 parts by weight of pozzolan powder (320 to 340 mesh), 0.6 pats by weight of ethyltrimethoxysilane, 0.2 parts by weight of jute fiber having an average thickness of 70 μm and an average length of 5 mm, 0.1 parts by weight of tartaric acid, 0.3 parts by weight of lithium carbonate, 0.2 parts by weight of a melment-based superplasticizer, 0.1 parts by weight of a thickening stabilizer, and 2.0 parts by weight of WAKER Polymer (RE5010N).

To test the performance, after 16 parts by weight of water was added per 100 parts by weight of the composition, followed by curing, various characteristics were evaluated by a test method KSF4042. The results are shown in Table 1 below.

TABLE 1

| Test item | | KSF4042 Standard | Example |
| --- | --- | --- | --- |
| Compressive strength (MPa) | | 20.0 or more | 61.2 |
| Bending strength (MPa) | | 6.0 or more | 9.8 |
| Bond strength (MPa) | Standard condition | 1.0 or more | 2.1 |
| | Repeated hot and cold condition | 1.0 or more | 2.1 |
| | Application of conventional man-made fiber for reinforcement | | 1.7 |

TABLE 1-continued

| Test item | KSF4042 Standard | Example |
| --- | --- | --- |
| Alkali resistance | 20.0 MPa or more | 46.8 |
| Carbonization resistance (mm) | 2.0 or less | 1.4 |
| Permeability (g) | 20 or less | 4.0 |
| Water flow coefficient | 0.5 or less | 0.21 |
| Resistance to moisture permeability (sd) | 2 m or less | 0.5 |
| Resistance to chloride ion permeability (coulombs) | 1000 or less | 531 |
| Change in length | ±0.15 | −0.030 |
| Setting time   Initial (min) | — | 30 |
|          Final (min) | — | 120 |

Referring to Table 1, it is found that the concrete repair composition of the example has excellent characteristics.

What is claimed is:

1. A concrete repair composition comprising:
   (a) 30 to 40 parts by weight of Ordinary Portland Cement Type 1;
   (b) 2 to 6 parts by weight of Calcium Aluminate Cement;
   (c) 2 to 5 parts by weight of Alumina Cement;
   (d) 2 to 5 parts by weight of calcium sulfonate;
   (e) 5 to 10 parts by weight of silica sand having an average particle size of 0.1 to 0.2 mm;
   (f) 25 to 35 parts by weight of silica sand having an average particle size of 0.3 to 0.6 mm;
   (g) 16 to 20 parts by weight of silica sand having an average particle size of 0.7 to 1.2 mm;
   (h) 5 to 10 parts by weight of pozzolan powder;
   (i) 0.4 to 0.8 parts by weight of alkylalkoxysilane; and
   (j) 0.1 to 0.3 parts by weight of jute fiber having an average thickness of 65 to 75 μm and an average length of 3 to 6 mm.

2. The concrete repair composition according to claim 1, wherein the concrete repair composition further includes 0.1 to 0.5 parts by weight of tartaric acid and 0.3 to 0.6 parts by weight of lithium carbonate.

* * * * *